US008938397B2

(12) United States Patent
Rosenberg et al.

(10) Patent No.: US 8,938,397 B2
(45) Date of Patent: Jan. 20, 2015

(54) SYSTEMS AND METHODS OF FACILITATING TRADING OF INSTRUMENTS

(75) Inventors: Richard Rosenberg, Prospect, KY (US); Patrick Morgan, Louisville, KY (US); Michael Schneider, Hoboken, NJ (US)

(73) Assignee: ICAP Services North America LLC, Jersey City, NJ (US)

( * ) Notice: Subject to any disclaimer, the term of this patent is extended or adjusted under 35 U.S.C. 154(b) by 139 days.

(21) Appl. No.: 12/882,591

(22) Filed: Sep. 15, 2010

(65) Prior Publication Data
US 2011/0016036 A1  Jan. 20, 2011

Related U.S. Application Data

(63) Continuation of application No. 11/781,495, filed on Jul. 23, 2007, now abandoned.

(51) Int. Cl.
*G06Q 40/04* (2012.01)

(52) U.S. Cl.
CPC .................................... *G06Q 40/04* (2013.01)
USPC ................................ 705/37; 705/35; 705/40

(58) Field of Classification Search
None
See application file for complete search history.

(56) References Cited

U.S. PATENT DOCUMENTS

| | | | | |
|---|---|---|---|---|
| 4,903,201 A * | 2/1990 | Wagner | | 705/37 |
| 5,077,665 A * | 12/1991 | Silverman et al. | | 705/37 |
| 5,101,353 A * | 3/1992 | Lupien et al. | | 705/37 |
| 5,375,055 A * | 12/1994 | Togher et al. | | 705/37 |
| 5,915,209 A | 6/1999 | Lawrence | | |
| 6,157,918 A * | 12/2000 | Shepherd | | 705/36 R |
| 6,233,566 B1 * | 5/2001 | Levine et al. | | 705/36 R |
| 6,260,025 B1 * | 7/2001 | Silverman et al. | | 705/37 |
| 6,304,858 B1 * | 10/2001 | Mosler et al. | | 705/37 |
| 6,321,212 B1 | 11/2001 | Lange | | |
| 7,110,972 B1 * | 9/2006 | Handa et al. | | 705/37 |
| 7,689,497 B2 * | 3/2010 | May | | 705/37 |
| 2002/0099641 A1 * | 7/2002 | Mills et al. | | 705/37 |
| 2005/0228748 A1 * | 10/2005 | Togher et al. | | 705/37 |
| 2006/0041498 A1 * | 2/2006 | Hausman et al. | | 705/37 |
| 2006/0074780 A1 * | 4/2006 | Taylor et al. | | 705/35 |
| 2007/0219882 A1 * | 9/2007 | May | | 705/35 |
| 2008/0010198 A1 * | 1/2008 | Eliscu | | 705/40 |

FOREIGN PATENT DOCUMENTS

WO  WO 99/19821  *  4/1999  ............. G06F 17/60

OTHER PUBLICATIONS

Clemons, E.K., et al., Merrill Lynch Cash Management Account Financial Service: A Case Study in Strategic Information Systems, 21.sup.st Annual Hawaii International Conference on Systems Sciences, vol. 4, 1988.*

* cited by examiner

*Primary Examiner* — Robert R Niquette
(74) *Attorney, Agent, or Firm* — Dickstein Shapiro LLP

(57) ABSTRACT

Systems and methods of facilitating trades of instruments are provided. A master node and a plurality of intermediate nodes store counterparty credit matrices. Trades are executed based on the information stored in these matrices. The systems and methods allow selection of trading options that not only accept or reject a trade, but also can indicate a credit status to be assigned to a counterparty to the trade.

36 Claims, 12 Drawing Sheets

| Trader A Credit Profile | 0-5 Year | 5-10 Year | 10-20 Year |
|---|---|---|---|
| Trader B | Reject for Day | Reject for Day | Check |
| Trader C | Reject for Day | Always Accept | Reject for Day |
| Trader D | Always Accept | Reject for Day | Always Reject |
| Trader E | Always Accept | Reject for Day | Always Accept |
| Trader F | Always Reject | Reject for Day | Always Reject |
| Trader G | Reject for Day | Check | Always Accept |
| Trader H | Reject for Day | Reject for Day | Reject for Day |

FIGURE 2A

|          | Trader A       | Trader B       | Trader C       | Trader D       | Trader E       | Trader F       | Trader G       | Trader H       |
|----------|----------------|----------------|----------------|----------------|----------------|----------------|----------------|----------------|
| Trader A | X              | Reject for Day | Reject for Day | Always Accept  | Always Accept  | Always Reject  | Reject for Day | Reject for Day |
| Trader B | Reject for Day | X              | Always Accept  | Check          | Check          | Always Reject  | Always Accept  | Reject for Day |
| Trader C | Reject for Day | X              |                | Always Reject  | Reject for Day | Always Reject  | Reject for Day | Reject for Day |
| Trader D | Always Accept  | Check          | Always Accept  | X              | Check          | Always Reject  | Check          | Check          |
| Trader E | Always Accept  | Always Accept  | Reject for Day | Reject for Day | X              | Reject for Day | Always Accept  | Check          |
| Trader F | Always Reject  | Check          | Check          | Reject for Day | Check          | X              | Reject for Day | Always Accept  |
| Trader G | Always Reject  | Always Accept  | Always Accept  | Check          | Always Accept  | Always Accept  | X              | Reject for Day |
| Trader H | Reject for Day | Always Reject  | Always Accept  | Check          | Check          | Check          | Check          | X              |

FIGURE 2B

| Instrument | Bid Price | Offer Price |
|---|---|---|
| $X_1$ | $Y_1$ | $Z_1$ |
| $X_2$ | $Y_2$ | |
| $X_3$ | | $Z_3$ |
| $X_4$ | $Y_4$ | $Z_4$ |
| $X_5$ | | $Z_5$ |

FIGURE 5

SYSTEMS AND METHODS OF FACILITATING TRADING OF INSTRUMENTS

CROSS-REFERENCE TO RELATED APPLICATIONS

The present application is a continuation of application Ser. No. 11/781,495, filed Jul. 23, 2007, the entire contents of which are incorporated herein by reference.

BACKGROUND OF THE INVENTION

The advent of electronic trading has reduced the transaction costs associated with trading securities, derivatives, and other items. In many electronic trading systems, however, it remains necessary for each party to a transaction to ensure that its exposure to credit risk arising from the possibility of default by its transaction counterparty does not exceed acceptable limits. Such credit risk is addressed in many cases by a clearing house or other centralized entity that stands behind every transaction and assumes the risk of transaction counterparty default. In other markets, however, such as markets for trading certain energy products, trading is typically conducted on a bi-lateral basis, without a centralized clearing entity, and each party assumes the credit risk associated with its trading counterparties, at least for some amount of time. Participants in these markets typically establish bi-lateral credit rules and/or limits where each trading entity specifies whether it is willing to trade with each potential counterparty and/or where each trading entity specifies maximum amounts of credit that it is willing to extend to such potential counterparties. This has resulted in many financial institutions developing credit evaluation departments to evaluate the credit risk of its trading counterparties. It has also resulted in the development of electronic trading systems that incorporate credit modules to store and apply such credit rules and/or or limits, which are widely used today.

SUMMARY OF THE INVENTION

Many small institutions do not have the capacity to develop an in-house credit evaluation department, and typically must evaluate credit risks on an ad-hoc basis. Furthermore, even for large institutions, the credit evaluation process is typically based upon proprietary algorithms developed by the particular financial institution. These credit evaluation algorithms provide very little, or no, opportunity for a trader at a particular institution to set the credit risk of a counterparty on an as needed basis. In addition, many prior art credit modules require the credit evaluation departments of participant firms to expend significant time and effort to populate such credit module with information concerning each potential counterparty before trading begins. The prior art does not include a simple and convenient mechanism whereby traders at a participant firm may populate the credit module with counterparty credit information as part of the normal trading process.

Accordingly, exemplary embodiments of the present invention provide systems and methods for facilitating trades of instruments by using credit matrices that may be pre-populated by a credit officer or other authorized personnel of a trading entity or, alternatively or in addition, may be populated by traders on an as-needed basis during the course of normal trading. One or more intermediate nodes, coupled to one or more trader terminals, can provide credit profiles to a master node. These node credit profiles identify a credit status of one or more counterparties for a plurality of instruments. A master node, coupled to the plurality of intermediate nodes, stores master trader credit matrices that correlate the credit status from the one or more intermediate node trader credit profiles. Exemplary embodiments of the present invention can allow or deny a trade based on the master trader credit matrix, and can update the master trader credit matrix based on information received in connection with an acceptance or rejection of a trade.

More specifically, in an exemplary embodiment, for each entity entitled to trade on the system, the master trader credit matrix can store one of four values for each potential counterparty (i.e., each other entity entitled to trade on the system):

(a) "Always Accept" (i.e., that the entity is "good to" (i.e., willing to trade with) the counterparty until further notice);

(b) "Always Reject" (i.e., that the entity is not "good to" (i.e., not willing to trade with) the counterparty until further notice);

(c) "Reject for Day" (i.e., that the entity is not "good to" (i.e., not willing to trade with) the counterparty for remainder of the trading day); and (d) "Check" (i.e., that the system should check with the entity at the time of a proposed transaction with the counterparty to see if the party is willing to do the trade).

In an exemplary embodiment, the value of each entry in the master trader credit matrix is initially set by the system to Check. If desired, these initial values may be modified in advance of trading (or at any time during the trading day) by the entity's credit officer to reflect the desired credit settings for each potential counterparty. Alternatively, some or all of the matrix may be left in its initial state (i.e., with every entry set to Check) and populated over time with credit information during the course of normal trading, as described below.

In particular, the present invention provides a convenient mechanism for populating a party's credit matrix on a counterparty-by-counterparty basis during the course of normal trading. In an exemplary embodiment, whenever an attempt is made to execute a transaction in the system (e.g., where a party hits a bid), the system retrieves the current value for the transaction counterparty from the master trader credit matrix. If that value is "Always Accept," this indicates that the counterparty is good to the party and that the trade may be executed (assuming, of course, that the party is also good to the counterparty). If, by contrast, the master trader credit matrix value for this counterparty is "Always Reject" or "Reject for Day," the proposed trade is rejected. Finally, where the master trader credit matrix value for this counterparty is "Check," the party is prompted as to whether the counterparty is good to it and, thus, whether the trade should be executed (assuming, of course, that the party is also good to the counterparty).

In addition, in an exemplary embodiment, in cases where the master trader credit matrix value for the counterparty is Check, the system can do more than merely ask the trader whether he or she wishes to proceed with the trade. Rather, the system provides the trader with four options: (i) Always Accept; (ii) Accept for Trade (i.e., accept the counterparty only for this trade); (iii) Always Reject; or (iv) Reject for Day. The response from the trader is then used not only to determine the outcome of the specific transaction but also to update the master trader credit matrix entry for such counterparty. In particular, where the trader enters Always Accept, the entry for the credit matrix entry for the counterparty is updated to Always Accept. Similarly, where the trader enters Reject for Day, the entry for the counterparty is updated to Reject for Day. By contrast, where the trader enters Accept for Trade, the entry for the counterparty is maintained as Check. Thus, as will be recognized, a firm may start trading using the present system without requiring its credit officer to laboriously pre-populate the master trader credit matrix for each counterparty. Rather, it may simply leave all entries in the matrix as Check, and have its traders conveniently populate the matrix with different values as the need arises in connection with an actual proposed transaction with a specific counterparty.

It should also be noted that the system does not, in an exemplary embodiment, present traders with a Reject for Trade option (but only a Reject for Day option). This is to prevent traders from abusing the Check procedure, by repeatedly rejecting individual trades to discover which counterparties own a given bid or offer, without such traders actually committing to a trade.

Other objects, advantages and novel features of the present invention will become apparent from the following detailed description of the invention when considered in conjunction with the accompanying drawings.

BRIEF DESCRIPTION OF THE DRAWING FIGURES

FIG. 2A is an exemplary intermediate node trader credit profile in accordance with the present invention;

FIG. 2B is an exemplary master trader credit matrix in accordance with the present invention;

FIG. 5 is an exemplary bid/offer window in accordance with the present invention.

DETAILED DESCRIPTION OF THE PREFERRED EMBODIMENTS

Figure 1A:
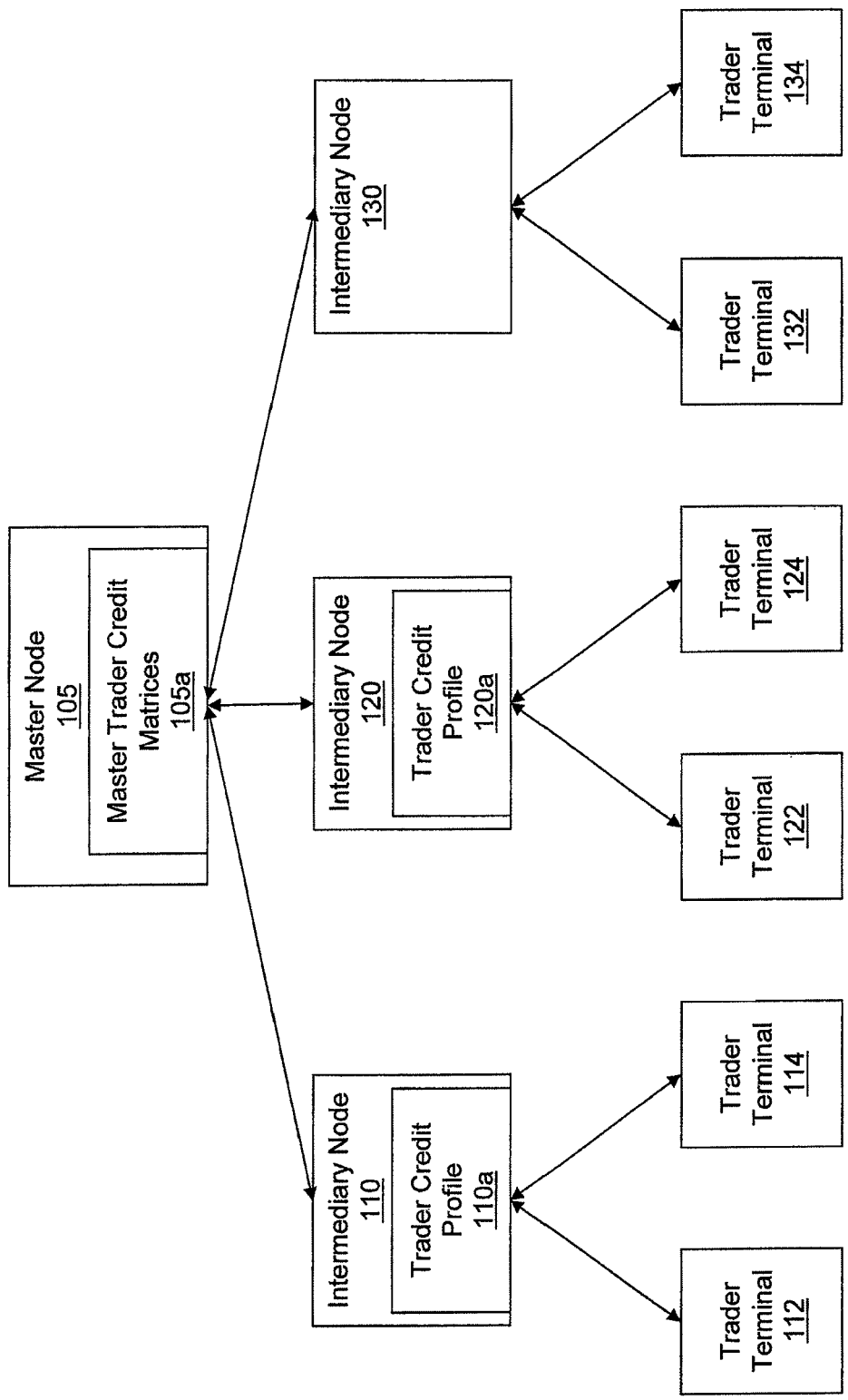
FIG. 1A is a block diagram of an exemplary system in accordance with the present invention.

FIG. 1A is a block diagram of an exemplary system in accordance with the present invention. The system includes a master node 105 coupled to a plurality of intermediate nodes 110-130. Each of the plurality of intermediate nodes is respectively coupled to one or more trader terminals 112-134. Each of the intermediate nodes 110-130 can be associated with a particular firm. The communication links coupling the trader terminal and the intermediate nodes, and the intermediate nodes and the master node, can be any type of wired and/or wireless communication link.

At least one of the plurality of intermediate nodes 110-130 can include a node trader credit profile 110a and 120a, which as will be described in more detail below, can be used to generate a master trader credit matrix. When an intermediate node does not provide a node trader credit profile to master node 105, the master trader credit matrix can include a predetermined credit status, such as the Check credit status described below. FIG. 2A is an exemplary intermediate node trader credit profile in accordance with the present invention. As illustrated in FIG. 2A, the credit profile for trader A identifies credit status for a plurality of traders B through H, for a plurality of instruments, 0-5 Year, 5-10 Year, and 10-20 Year. Although particular instruments are illustrated in FIG. 2A, the present invention can be employed with any type of tradeable instrument, such as energy instruments.

The credit status Always Accept means that trader A will accept the ability to trade with another trader. Credit status Check means trader A has not taken a position with respect to the credit status of the particular trader. Credit status Reject for Day means that trader A refuses to accept any transactions with the particular trader for the balance of the day, and the credit status will reset to Check at the start of the next business day. Credit status Always Reject means that trader A refuses to accept transactions with the particular trader, and this status is maintained until trader A specifically changes the credit status of the trader.

Returning now to FIG. 1A, master node 105 includes master trader credit matrices 105a generated from the one or more intermediate trader credit profiles 110a and 120a. FIG. 2B is an exemplary master trader credit matrix in accordance with the present invention. The illustrated master trader credit matrix is for a particular instrument, and identifies the credit status assigned by each trader to other traders. The master node 105 can include one of these matrices for each of a plurality of instruments. As will be described in more detail below, the master trader credit matrices are employed to facilitate trades.

Figure 1B:
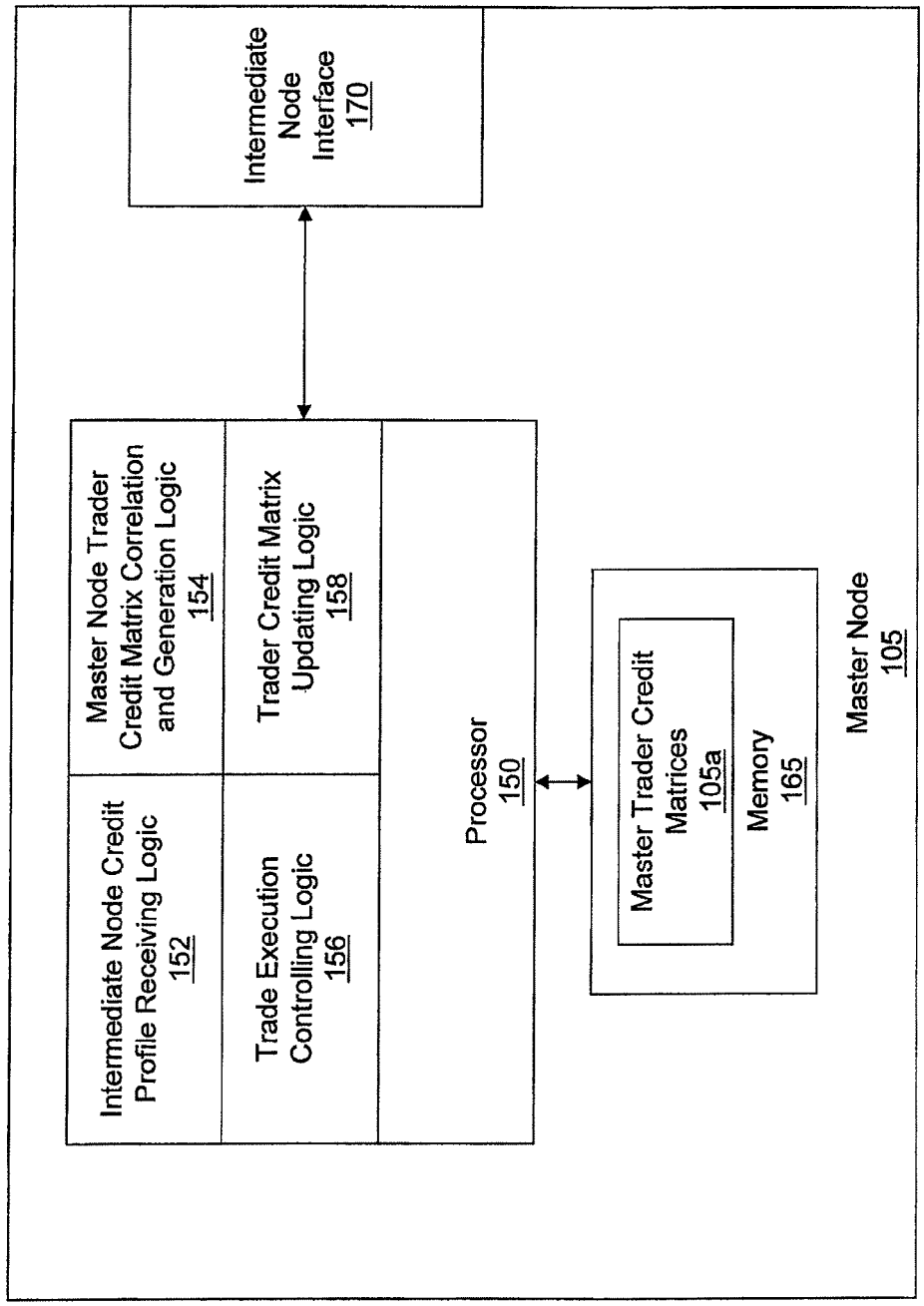
FIG. 1B is a block diagram of an exemplary master node in accordance with the present invention.

FIG. 1B is a block diagram of an exemplary master node in accordance with the present invention. Master node 105 includes processor 150, memory 165 and intermediate node interface 170. Processor 150 includes logic 152-158, which will be described in more detail below in connection with FIGS. 3 and 4A-4E. Processor 150 can be any type of processor, such as a microprocessor, field programmable gate array (FPGA) and/or an application specific integrated circuit (ASIC). When processor 150 is a microprocessor then logic 152-158 can be processor-executable code loaded from memory 165. Memory 165 stores, inter alia, master node matrices 105a. Intermediate node interface 170 can be any type of interface for communicating with the intermediate nodes. Although FIG. 1B illustrates only a single intermediate node interface, master node 105 can include more than one such interface.

Figure 3:
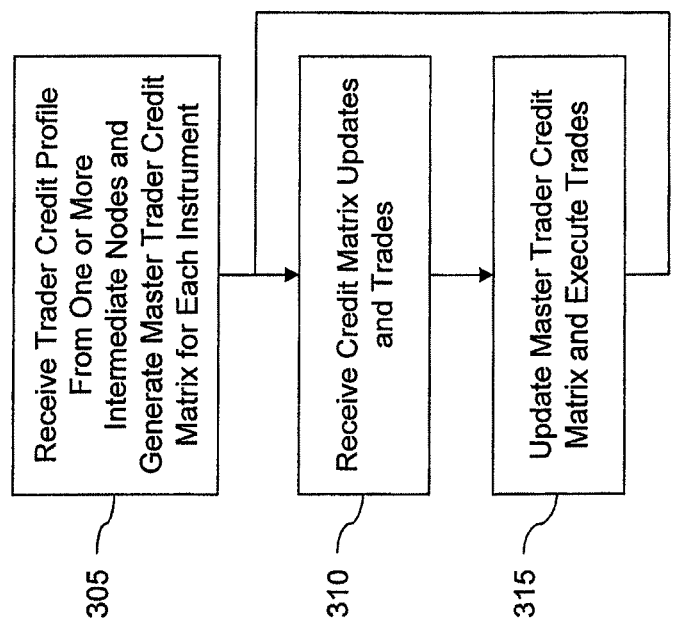
FIG. 3 is a flow diagram of an exemplary method in accordance with the present invention.

FIG. 3 is a flow diagram of an exemplary method in accordance with the present invention. This method is an overview of the functions provided by the present invention for facilitating a trade. Initially, logic 152 of master node 105 receives trader credit profiles from one or more intermediate nodes by way of interface 170, and logic 154 generates a master trader credit matrix for each instrument (step 305). When an intermediate node does not provide a trader credit profile, the master trader credit matrix can set the intermediate node's credit designation of other traders to a predetermined credit status, such as Check. Master node 105 then receives credit matrix updates and associated trading information (step 310), and logic 158 updates the master trader credit matrix and logic 156 executes trades (step 315). Steps 310 and 315 are then repeated, as illustrated by the return path from step 315 to step 310.

FIGS. 4A-4E are flow diagrams of an exemplary method in accordance with the present invention. Initially, trader credit profiles are received from one or more intermediates node by logic 152 of master node 105 (step 402). These initial credit profiles can be prepared by a designated officer, such as a credit officer or trader, of the institution associated with the intermediate node. If desired, the credit officer and trader may simply submit a "blank" profile, i.e., one in which all entries are set to Check. Logic 154 of master node 105 then correlates the trader credit profiles for each instrument (step 404), generates a master trader credit matrix for each instrument and stores the matrix in memory 165 (step 406). Because exemplary embodiments of the present invention can generate the master trader credit matrix based on information obtained during trading, the present invention need not necessarily receive trader credit profiles. In this case, steps 402 and 404 can be omitted, if desired, and the generated master trader credit matrix can include a Check status for all traders.

Master node 105 receives bids/offers over interface 170 (step 408) and logic 156 accesses the master trader credit matrix 105a to identify the credit status of the traders (step 412). Master node 105 then outputs the bid/offer window indicating the credit status to the relevant traders (step 414).

FIG. 5 is an exemplary bid/offer window in accordance with the present invention. The bid/offer window lists a plurality of instruments and associated bid/offer prices. As illustrated in FIG. 5, certain instruments are highlighted, to identify a particular tradable status of the instrument. For example, instrument $X_2$ may be bid for, and instrument $X_4$ may be offered by, the party for which the trader viewing the screen has assigned a credit status of Reject for Day or Always Reject. Alternatively, or additionally, the trader viewing the screen may have been assigned a credit status by the counterparties bidding for, or offering, instruments $X_2$ and $X_4$ as Reject for Day or Always Reject. Although FIG. 5 illustrates only Reject for Day and Always Reject instruments as being highlighted, all instruments can be highlighted to indicate a tradeable status, e.g., red for Reject for Day and Always Reject, and white for all other tradeable status.

Figure 4A:
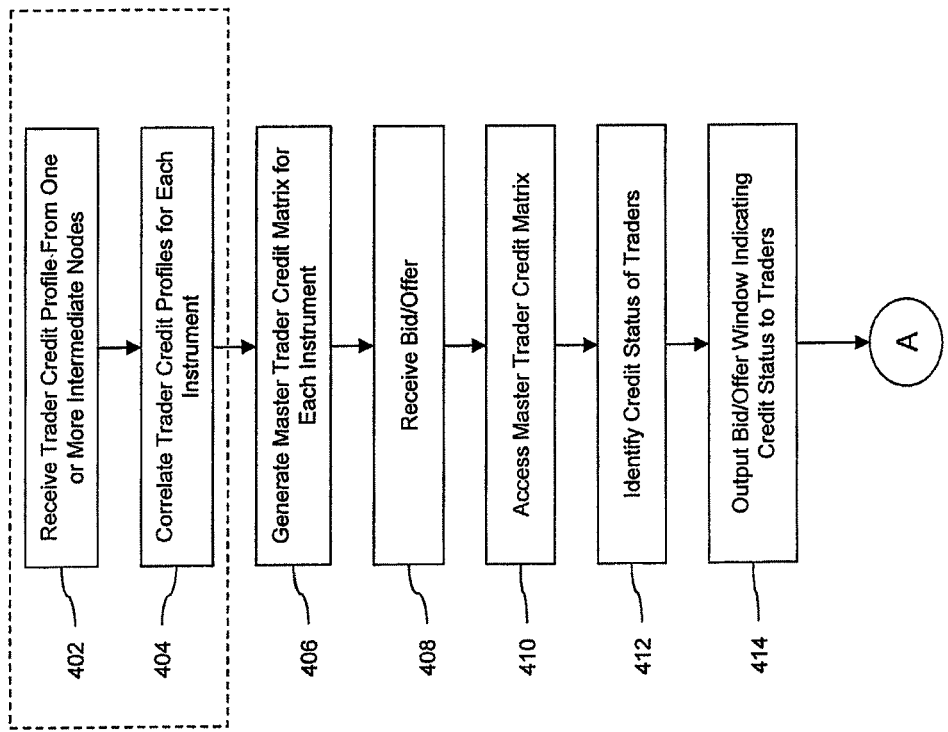
FIGS. 4A-4E are flow diagrams of an exemplary method in accordance with the present invention.
Figure 4B:
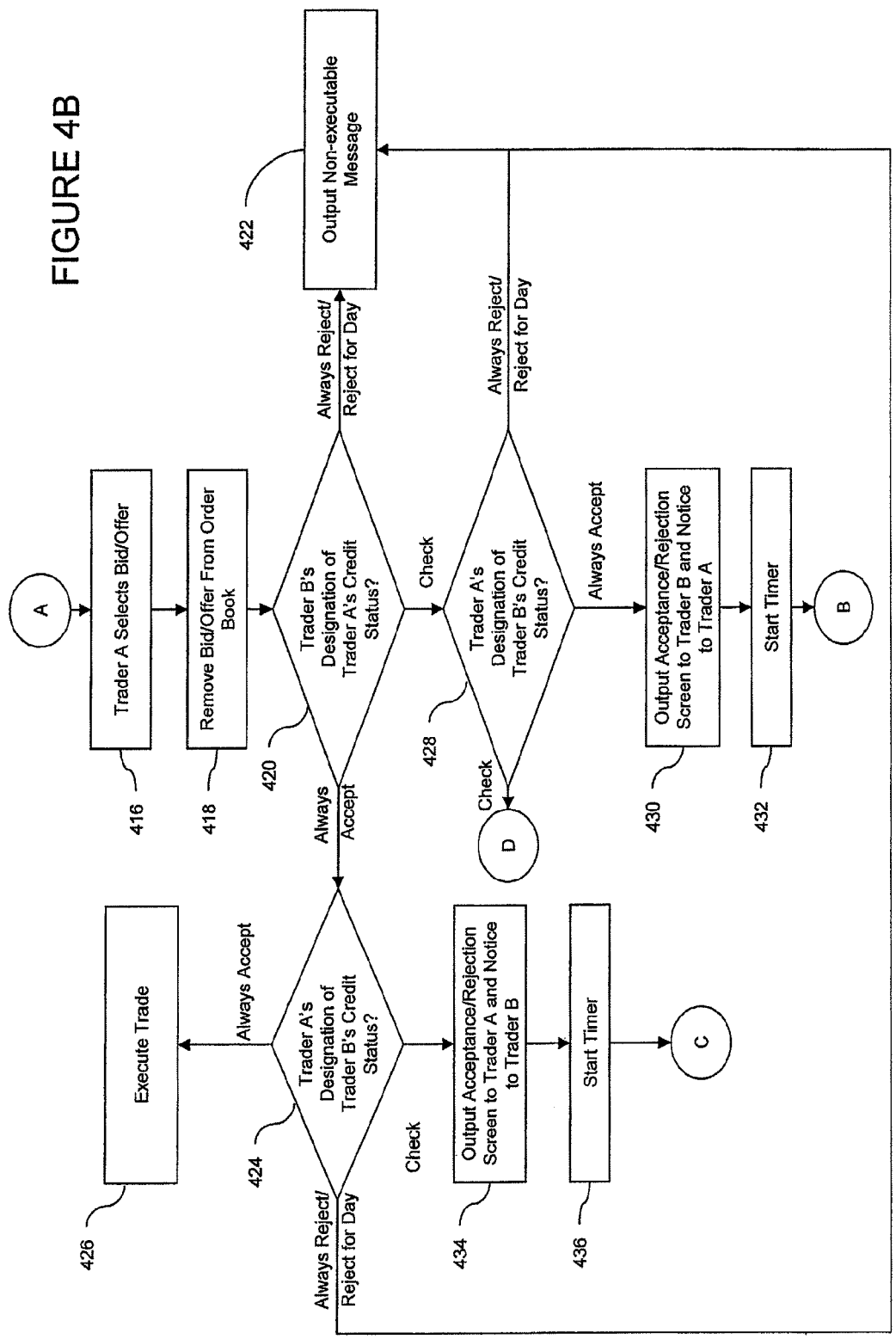

Turning now to FIG. 4B, when a trader A selects a bid/offer from the screen illustrated in FIG. 5 (step 416), logic 156 removes the bid/offer from the order book (step 418). Logic 156 of master node 105 then determines trader B's designation of trader A's credit status for the selected instrument (step 420). When trader B has designated trader A's credit status as Always Reject or Reject for Day, then a non-executable message is output to trader A (step 422). For example, if the trader A selects instrument $X_2$ or $X_4$ from the window illustrated in FIG. 5, the non-executable message will be output to such trader.

When trader B's designation of trader A's credit status is Check (step 420), then trader A's designation of trader B's credit status is determined (step 428). When trader A has designated trader B's credit status as Always Reject or Reject for Day, then a non-executable message is output to trader A (step 422). When trader A has designated trader B's credit status as Always Accept, then logic 156 outputs an acceptance/rejection screen to trader B, a notice is output to trader A and a timer is started (steps 430 and 432).

Figure 6:
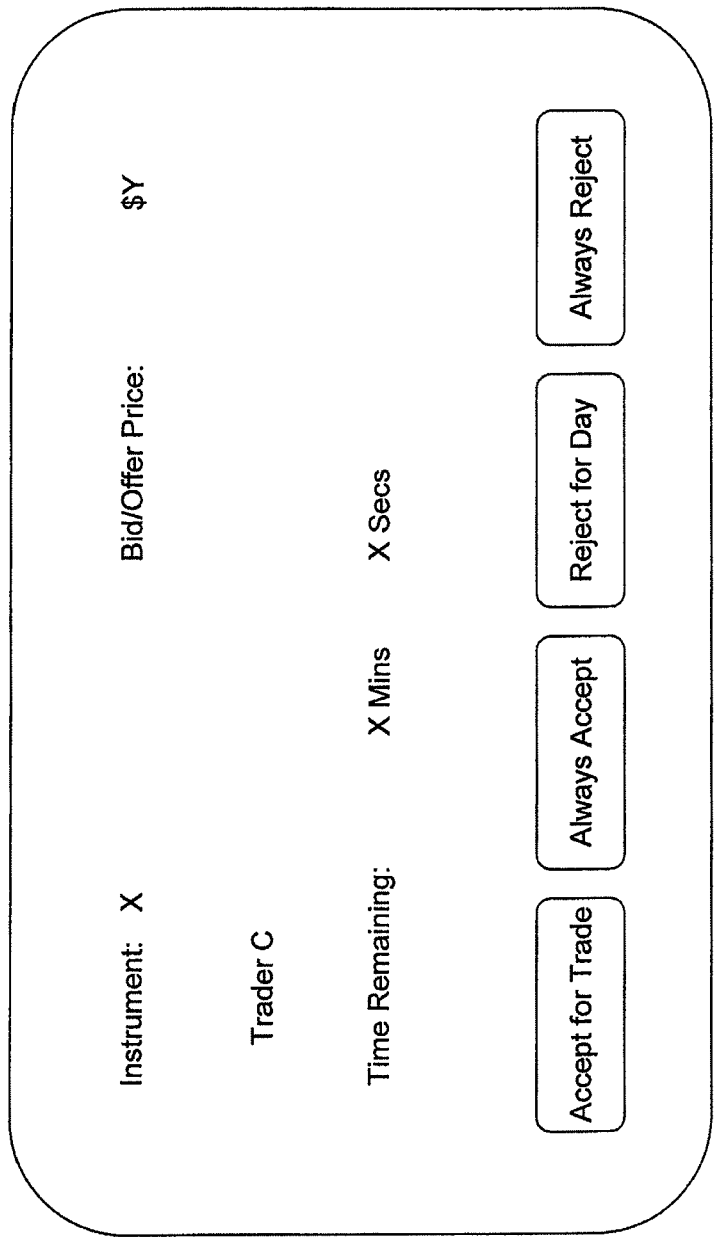
FIG. 6 is an exemplary acceptance/rejection window in accordance with the present invention.

FIG. 6 is an exemplary acceptance/rejection window in accordance with the present invention. The acceptance/rejection window identifies the selected instrument, and associated bid/offer price, the counterparty and a time remaining to execute the trade. The window also provides four options to any trader whose credit preference for the other trader is set to Check, the selection of which not only accepts or denies the pending trade, but also can update the credit status of a counterparty. A trade is executed only when each party has accepted the credit of the other party before the expiration of the time period. If one of the counterparties does not make a selection within the time period, or if one or both of the counterparties selects Reject for Day or Always Reject, then the trade is denied, and the instrument is returned to the order book in the original position in the order queue. If a party does not respond, then that party's order will not be returned to the order book. The various combinations of selections between first and second counterparties will be described below in connection with FIGS. 4C through 4E.

Figure 4C:
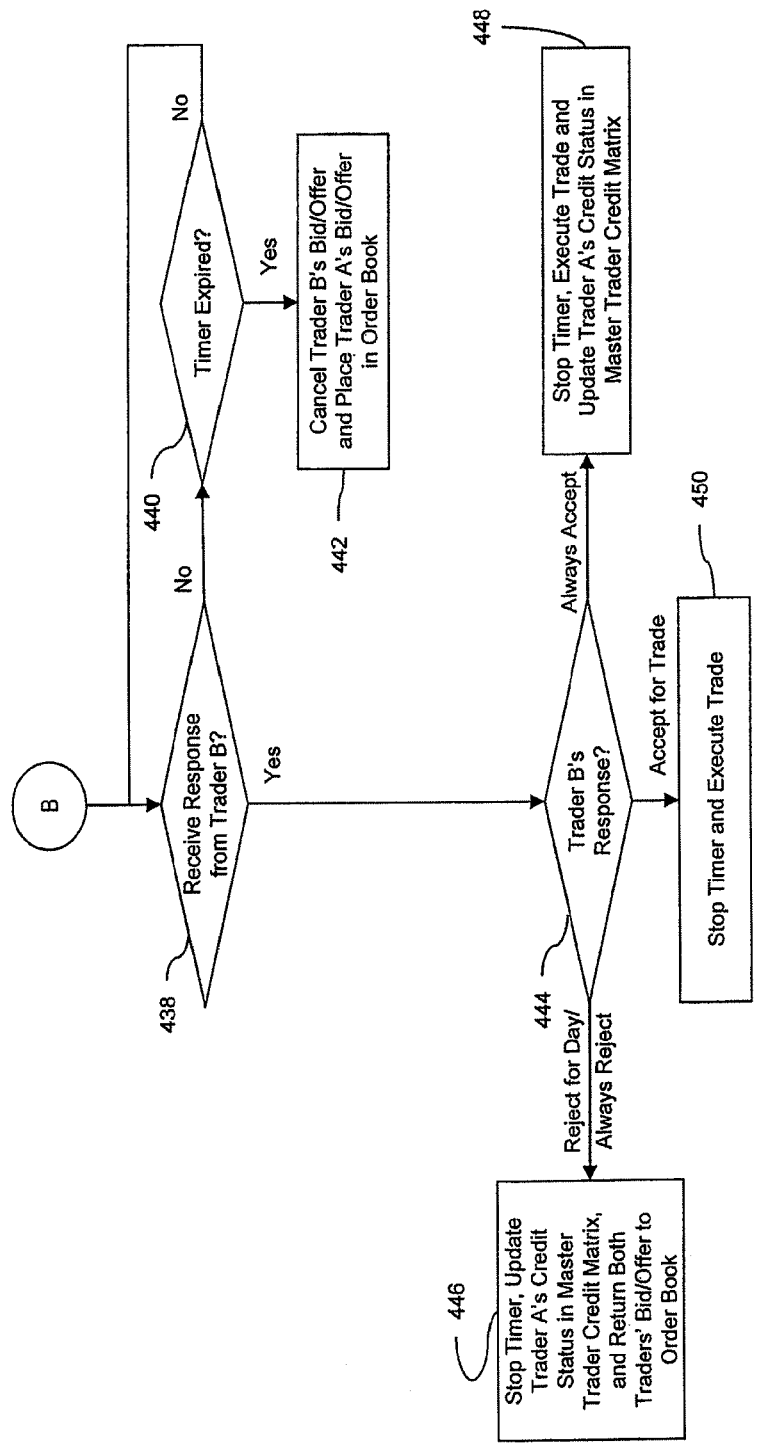

Turning now to FIG. 4C, logic 156 determines whether a response has been received from trader B (step 438). When no response is received from trader B ("No" path out of decision step 438), then it is determined whether the timer has expired (step 440). When the timer has expired ("Yes" path out of decision step 440), then trader B's bid/offer is canceled, and trader A's bid/offer is placed in the order book (step 442). If the timer has not expired ("No" path out of decision step 440), then the method continues to wait for a response from trader B (step 438).

When a response is received from trader B ("Yes" path out of decision step 438), then logic 156 determines what type of response is received (step 444). When trader B's response is Reject for Day or Always Reject, then the timer is stopped, trader A's credit status is updated in the master trader credit matrix to reflect the new credit status, and both traders' bid/offer are returned to the order book (step 446). When the response is Accept for Trade, then the timer is stopped and the trade is executed (step 450). When the response is Always Accept, then the timer is stopped, the trade is executed and trader A's credit status is updated in the master matrix to reflect the new credit status (step 448).

Figure 4D:
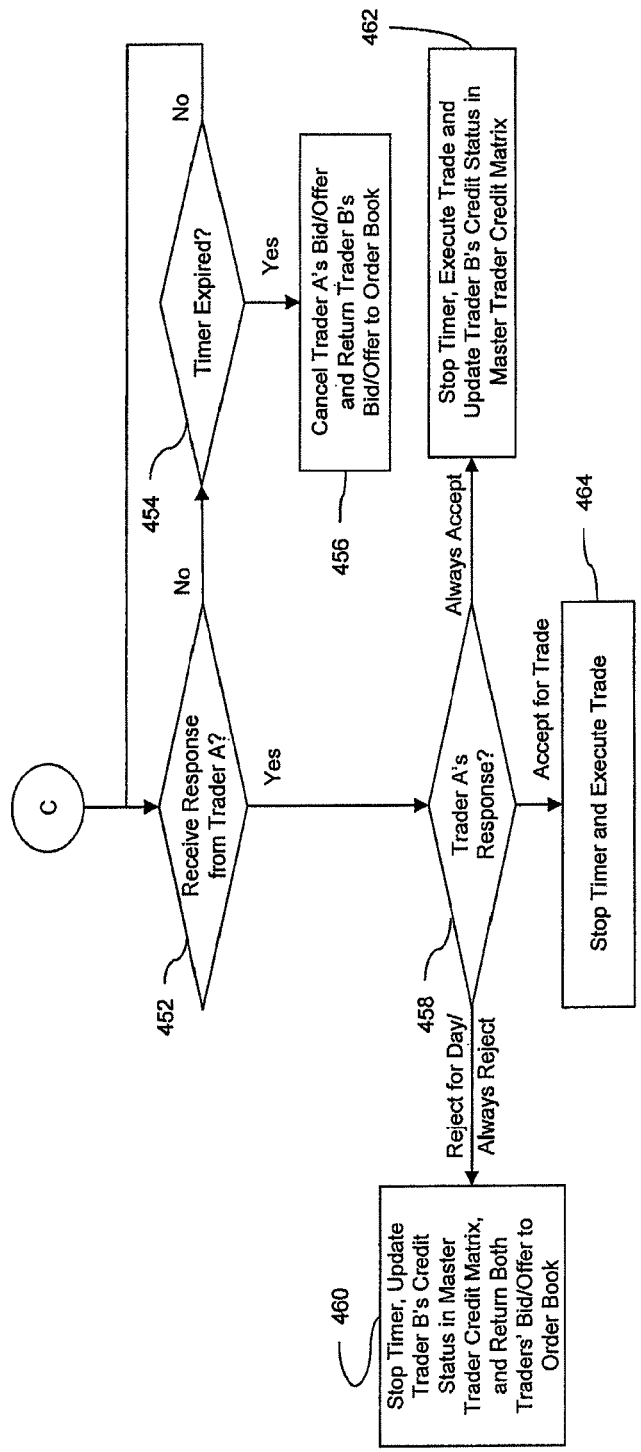
Figure 4E:
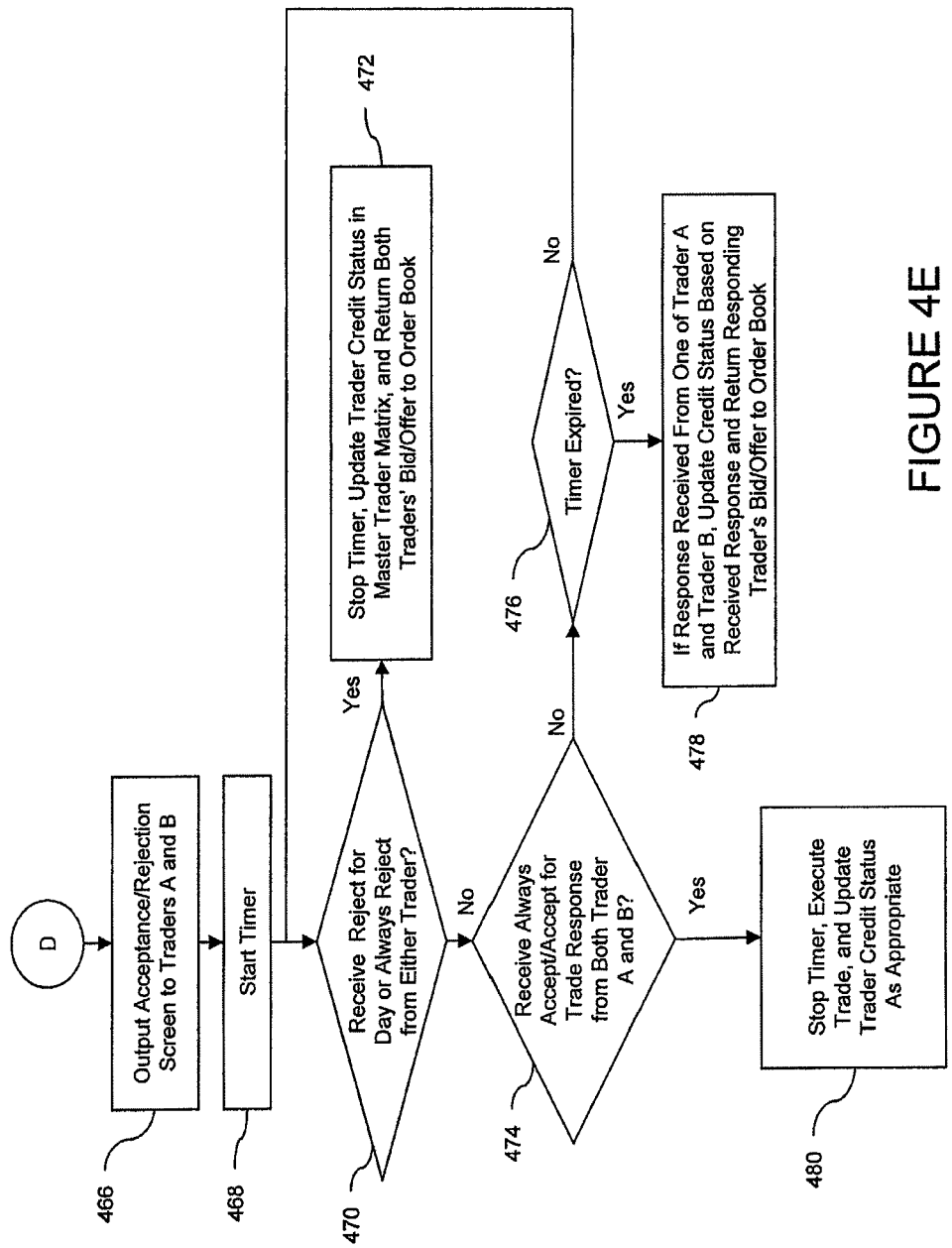

Returning now to FIG. 4B, when both traders have designated the other trader with a Check credit status, then, as illustrated in FIG. 4E, logic 156 outputs an acceptance/rejection screen to traders A and B and a timer is started (steps 466 and 468). Logic 156 then determines whether it has received a Reject for Day or Always Reject from either trader (step 470). When logic 156 determines that it has received Reject for Day or Always Reject from either trader ("Yes" path out of decision step 470), then the timer is stopped and the trader credit status is updated in the master trader credit matrix for the appropriate trader, and the both traders' bid/offer are returned to the order book (step 472). Although not illustrated in FIG. 4E, if after receiving a Reject for Day or Always Reject from one trader, one of these selections is received from the other trader, the credit status can be updated based on the selection received from the other trader, if desired.

When a Reject for Day or Always Reject is not received from either trader ("No" path out of decision step 470), then it is determined whether an Always Accept or Accept for Trade is received from both traders A and B (step 474). When either of these options are not received from both traders ("No" path out of decision step 474), then it is determined whether the timer has expired (step 476). When the timer has expired ("Yes" path out of decision step 476), and if a response was received from one of the traders, the credit status of the other trader is updated in the master trader credit matrix based on the received response and the responding trader's bid/offer is returned to the order book (step 478). When the timer has not expired ("No" path out of decision step 476), then the method returns to step 470 to wait for a response from one or both of the traders.

When an Always Accept or Accept for trade is received from both traders ("Yes" path out of decision step 474), then the timer is stopped, the trade is executed and the traders' credit status is updated as appropriate (step 480). For example, if both traders selected Accept for Trade, then there would be no update to the master trader credit matrix. However, when, for example, trader A selects Accept for Trade and trader B selects Always Accept, trader B's designation of trader A's credit status in the master matrix is updated to Always Accept, but trader A's designation of trader B's credit status does not change.

Returning again to FIG. 4B, when trader B's designation of trader A's credit status is Always Accept (step 420), then logic 156 of master node 105 determines trader A's designation of trader B's credit status (step 424). When trader A has designated trader B's credit status as Always Reject or Reject for Day, then a non-executable message is output to trader A (step 422). When trader A has designated trader B's credit status as Always Accept, then the trade is executed (step 426).

When trader A has designated trader B's credit status as Check, then logic 156 outputs an acceptance/rejection screen to trader A and notice of A's selection of the bid or offer is output to trader B and a timer is started (steps 434 and 436). Turning now to FIG. 4D, logic 156 determines whether a response has been received from trader A (step 452). When no response is received from trader A ("No" path out of decision step 452), then it is determined whether the timer has expired (step 454). When the timer has expired ("Yes" path out of decision step 454), then trader A's bid/offer is canceled, and trader B's bid/offer is returned to the order book (step 456). If the timer has not expired ("No" path out of decision step 454), then the method continues to wait for a response from trader A (step 452).

When a response is received from trader A ("Yes" path out of decision step 452), then logic 156 determines what type of response is received (step 458). When trader A's response is Reject for Day or Always Reject, then the timer is stopped, trader B's credit status is updated in the master matrix to reflect the new credit status and both traders' bid/offer are returned to the order book (step 460). When the response is Accept for Trade, then the timer is stopped and the trade is executed (step 464). When the response is Always Accept, then the timer is stopped, the trade is executed and trader B's credit status is updated in the master matrix to reflect the new credit status (step 462).

In the method of FIGS. 3 and 4A-4E, when one party selects Accept for Trade or Always Accept option and the counterparty does not make a selection within the time period of the timer, a message can be provided to either or both parties indicating that the trade was not executed.

The present invention can also be employed to execute outright orders that are implied by combo orders. A combo order can be, for example, a trader bidding on swap A/B, meaning that the trader wants to buy instrument A and sell instrument B at the trader's quoted spread. In order to understand the issues related to these types of orders, the following example is provided.

Assume trader X is bidding on swap A/B and that there is a bid on outright instrument B from another trader. As long as that bid remains on instrument B, a bid should automatically be entered on outright instrument A, on trader X's behalf. Since the ratio on swap trades is one for one, trader X's bid quantity on instrument A must equal the bid size on instrument B, and the size of the implied order cannot exceed that of the original swap bid.

If trader X is aggressed on his bid on outright A, then the system must automatically aggress the bid on instrument B. These two outright executions equate to the execution of the original A/B swap bid, and the swap bid would be cancelled.

It will be recognized that there are three order "linkages" to be addressed in this example. The first is the generation of the bid on outright instrument A. The second is the automatic aggress on instrument B, triggered by the aggress on instrument A. The third is the deletion of the bid on swap A/B, triggered by either the outright A or B transaction, since they are effectively simultaneous.

If credit checks were allowed in the above example, the following complications would arise. If trader X were aggressed on his implied bid in A, then the system would automatically aggress the bid on instrument B. Both trades would go into a Check state. Neither trade could be finalized until trader X, and his counterparties on both A and B, had accepted the trades. If trader X and counterparty A accepted, but counterparty B rejected, then the trade between X and counterparty A would also have to be rejected since the two trades are dependent. The trade between X and counterparty B is similarly dependent on mutual acceptance between X and counterparty A. Furthermore, X's bid on swap A/B would have to be suspended or removed from the market while the outright trades were checking. If X's swap bid were eligible for execution while the outright trades were checking, then there would be a risk of X duplicating his trade: once by executing the swap A/B, and once by buying A outright and selling B outright.

To address the above-identified problems with orders implied from combos, implied orders should be generated only if all potential parties to the component trades are "Always Accept" to each other. This ensures the immediate execution of all component trades.

The following is an example addressing this solution. Again, assume Trader X is bidding on swap A/B, there is a bid on outright instrument B from another trader. Assume further that the customer bidding on B is "Always Accept" to trader X, and vise versa. This ensures that X will be able to execute on instrument B without any delay from a credit check. As long as that bid remains on instrument B, a bid should automatically be entered on outright instrument A, on trader X's behalf.

X's bid on instrument A should show as tradeable only to those customers with whom X is mutually Always Accept. This ensures that any attempted execution of X's bid will be accepted without delay from a credit check. Since the ratio on swap trades is one for one, trader X's bid quantity on instrument A must equal the bid size on instrument B, and the size of the implied order cannot exceed that of the original swap bid.

If trader X is aggressed on his bid on outright A, then the system must automatically aggress the bid on instrument B. These two outright executions equate to the execution of the original A/B swap bid, and the swap bid would be cancelled.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A computerized method for facilitating trading of instruments on a computerized trading system comprising a master node, a plurality of trader terminals, and a plurality of intermediate nodes each arranged between the master node and one or more of the plurality of trader terminals, the method comprising the acts of:
   the master node receiving a first intermediate node credit profile from a first intermediate node, the first intermediate node credit profile comprising the credit status of a first party with respect to at least one other party on said computerized trading system, the credit status received from the first party;
   the master node receiving one or more further intermediate node credit profiles from one or more further intermediate nodes;
   the master node generating a master trader credit matrix using the first intermediate node credit profile and the one or more further intermediate node credit profiles, at least one of the credit statuses stored in the master trader credit matrix instructing the master node to ask a first trader to accept or reject a trade; and the master node receiving the first trader's response and updating the master trader credit matrix based thereon; and the master node allowing or denying trades based on the master trader credit matrix.

2. The method of claim 1, wherein the credit status information is a credit status assigned from a first party to the trade to a second party to the trade.

3. The method of claim 1, wherein the credit status information is a credit status assigned from a second party to the trade to a first party to the trade.

4. The method of claim 1, wherein the credit status information in the credit profile is a credit status from the group consisting of always accept, reject for the day, always reject, or check.

5. The method of claim 1, further comprising the act of: outputting a window identifying at least one instrument available for trading.

6. The method of claim 5, wherein the window also identifies a tradeable status of the at least one instrument.

7. The method of claim 5, further comprising the act of: outputting a trade acceptance screen providing options associated with a trade for the available instrument.

8. The method of claim 7, wherein the options for trade include accept for trade, always reject, reject for the day, or always accept.

9. The method of claim 8, wherein selecting one of the options for trade indicates acceptance or rejection of the trade and credit information regarding a counterparty.

10. The method of claim 7, wherein the trade acceptance screen also indicates a time remaining for accepting or rejecting the trade.

11. The computerised method of claim 1, wherein said first intermediate node credit profile and said further intermediate node credit profiles each comprise a credit status for a plurality of counterparties and a plurality of instruments.

12. A master node for a computerized trading system comprising:
an intermediate node interface;
a memory; and
a processor, coupled to the intermediate node interface and memory, the processor comprising:
intermediate node credit profile receiving logic that receives a first intermediate node credit profile from a first intermediate node, the first intermediate node credit profile comprising the credit status of a first party with respect to at least one other party on said computerized trading system and sent to the first intermediate node by the first party, and receives one or more further intermediate node credit profiles from one or more further intermediate nodes;
master trader credit matrix generating logic that generates a master trader credit matrix using the first intermediate node credit profile and the one or more further intermediate node credit profiles and stores the generated matrix in the memory, at least one of the credit statuses stored in the master trader credit matrix instructing the master node to ask a first trader to accept or reject a trade; and
credit matrix updating logic that receives the first trader's response and updates the master trader credit matrix based thereon; and
trade execution controlling logic that allows or denies trades based on the master trader credit matrix.

13. The master node of claim 12, wherein the credit status information is a credit status assigned from a first party to the trade to a second party to the trade.

14. The master node of claim 12, wherein the credit status assigned from a second party to the trade to a first party to the trade.

15. The master node of claim 12, wherein the credit status information in the credit profile is a credit status from the group consisting of: always accept, reject for the day, always reject, or check.

16. The master node of claim 12, wherein a window is output that identifies at least one instrument available for trading.

17. The master node of claim 16, wherein the window also identifies a tradeable status of the at least one instrument.

18. The master node of claim 16, wherein a trade acceptance screen, providing options associated with a trade for the available instrument, is output.

19. The master node of claim 18, wherein the options for trade include accept for trade, always reject, reject for a day or always accept.

20. The master node of claim 19, wherein selecting one of the options for trade indicates acceptance or rejection of the trade and credit information regarding a counterparty.

21. The master node of claim 18, wherein the trade acceptance screen also indicates a time remaining for accepting or rejecting the trade.

22. A master node according to claim 12, comprising credit profile designating logic for setting the credit profile of an intermediate node communicating with the master node from which a credit profile is not received.

23. A computerized method for facilitating trading of instruments on a computerized trading system comprising a master node, a plurality of trader terminals, and a plurality of intermediate nodes each arranged between the master node and one or more of the plurality of trader terminals, the method comprising the acts of:
the master node generating a master trader credit matrix, the master trader credit matrix comprising the credit status of each of a plurality of parties trading on the computerized trading system with respect to others of said plurality of parties, the credit status received from each of the plurality of parties, at least one of the credit statuses stored in the master trader credit matrix instructing the master node to ask a first trader to accept or reject a trade; and
the master node receiving the first trader's response and updating the master trader credit matrix based thereon; and
the master node allowing or denying trades based on the master trader credit matrix.

24. The method of claim 23, wherein the generated master trader credit matrix includes a default credit status for all parties listed in the credit matrix.

25. The method of claim 24, wherein the default credit status is a check credit status.

26. The method of claim 23, wherein the credit status information is a credit status assigned from a first party to the trade to a second party to the trade.

27. The method of claim 23, wherein the credit status information is a credit status assigned from a second party to the trade to a first party to the trade.

28. The method of claim 23, wherein the credit status information is a credit status from the group consisting of: always accept, reject for the day, always reject, or check.

29. The method of claim 23, further comprising the act of: outputting a window identifying at least one instrument available for trading.

30. The method of claim 29, wherein the window also identifies a tradeable status of the at least one instrument.

31. The method of claim 29, further comprising the act of: outputting a trade acceptance screen providing options associated with a trade for the available instrument.

32. The method of claim 31, wherein the options for trade include accept for trade, always reject, reject for the day or always accept.

33. The method of claim 32, wherein selecting one of the options for trade indicates acceptance or rejection of the trade and credit information regarding a counterparty.

34. The method of claim 31, wherein the trade acceptance screen also indicates a time remaining for accepting or rejecting the trade.

35. The computerised method of claim 23, wherein said first intermediate node credit profile and said further intermediate node credit profiles each comprise a credit status for a plurality of counterparties and a plurality of instruments.

36. A computerised method for facilitating trading of a plurality of instruments on a computerised trading system comprising a master node, a plurality of trader terminals, and a plurality of intermediate nodes each arranged between the master node and one or more of the plurality of trader terminals, the method comprising the acts of:

the master node receiving a first intermediate node credit profile from a first intermediate node, the first intermediate node credit profile comprising the credit status of a first party with respect to at least one other party on said computerised trading system;

the master node receiving one or more further intermediate node credit profiles from one or more further intermediate nodes;

the master node generating a specific master trader credit matrix for each of the plurality of instruments using the first intermediate node credit profile and the one or more further intermediate node credit profiles, at least one of the credit statuses stored in the master trader credit matrix instructing the master node to ask a first trader to accept or reject a trade; and the master node receiving the first trader's response and updating the master trader credit matrix based thereon; and the master node allowing or denying a trade based on the master trader credit matrix.

\* \* \* \* \*